United States Patent [19]
Becker

[11] Patent Number: 4,844,476
[45] Date of Patent: Jul. 4, 1989

[54] VIDEO TARGET RESPONSE APPARATUS AND METHOD EMPLOYING A STANDARD VIDEO TAPE PLAYER AND TELEVISION RECEIVER

[76] Inventor: James F. Becker, 145 Hart Ave., Santa Monica, Calif. 90405

[21] Appl. No.: 113,217

[22] Filed: Oct. 23, 1987

[51] Int. Cl.⁴ .............................................. A63F 9/22
[52] U.S. Cl. ................................... 273/312; 273/313; 273/DIG. 28; 273/1 E; 434/20; 434/22; 340/707
[58] Field of Search ................................ 273/311–316, 273/1 E, 85 G, DIG. 28; 340/707, 708; 434/307, 323, 327, 20, 21, 22, 43; 235/471; 382/559

[56] References Cited

U.S. PATENT DOCUMENTS

| | | | |
|---|---|---|---|
| 4,329,684 | 5/1982 | Monteath et al. | 340/707 |
| 4,395,045 | 7/1983 | Baer | 273/DIG. 28 |
| 4,662,635 | 5/1987 | Enokian | 273/DIG. 28 |

Primary Examiner—Maryann Lastova
Attorney, Agent, or Firm—Ashen Golant Martin & Seldon

[57] ABSTRACT

This apparatus is used with a video tape of a scene that includes a target. At least part of the target has selected interlace fields removed, so that when the scene is displayed a distinctive periodic sequence of light pulses is associated with that target. An unmodified, standard video cassette machine plays the tape into a similarly unmodified television receiver to display the scene, particularly including omission of the selected fields in each target. A response module—with no connection to or from, and no output to, either the tape player or the receiver—includes a detector, an imaging system, a sight, circuitry, and a trigger. The imaging system receives light from a limited portion of the displayed scene, and directs that light to the detector. The sight aids a user to point the imaging system toward a particular desired scene portion. The circuitry develops an output signal related to the light on the detector. The trigger is for user manipulation to register a particular scene portion for evaluation. the system also includes provision for analyzing the output signal to detect presence of a pulse sequence associated with a target; and for communicating the result of this analysis to the user.

30 Claims, 6 Drawing Sheets

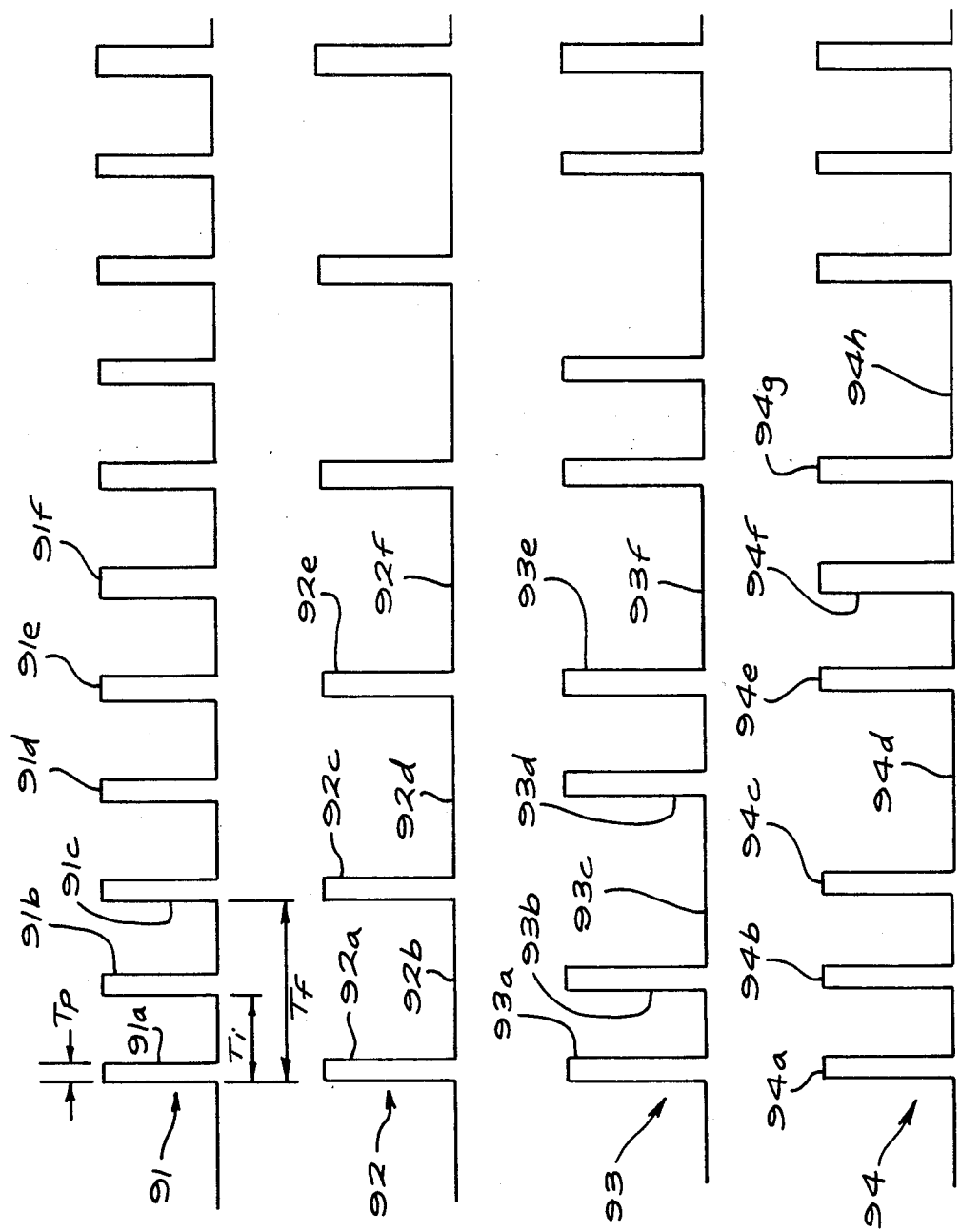

VIDEO TARGET RESPONSE APPARATUS AND METHOD EMPLOYING A STANDARD VIDEO TAPE PLAYER AND TELEVISION RECEIVER

BACKGROUND

1. FIELD OF THE INVENTION

This invention relates generally to video response devices such a video games and video learning systems; and more particularly to a very inexpensive apparatus for registering responses to video images displayed by a standard video tape player and television receiver.

2. PRIOR ART

Arcade and home video games—and video learning systems—produced by computer, using images displayed on a computer monitor, are well known. A computer employed for such purposes in some cases is a dedicated "game computer," using software either permanently embedded in the computer or carried in cartridges; and in other cases is a general-purpose personal computer using game software read into the machine memory by floppy discs or the like.

Some such games make use of an ordinary television receiver set, connected to receive signals from the computer. In this type of game the television receiver may be modified to receive signals from the computer rather than from a conventional video source.

Although many video games and learning systems use input responses from a keyboard or a joystick, some are based on the concept of aiming a "gun" or the like at a target displayed on the screen. In these games the computer—and through it the computer monitor or television receiver—receive signals from the gun, and these signals are used to determine the accuracy of aim.

Results of this determination are used interactively by the programmed computer to generate and display effects on the screen, indicating where the gun was in fact pointed and in some cases also changing the screen display when the gun was aimed correctly. Further, scores are developed by the computer and fed back to the monitor or receiver screen for display along with the target display.

Various electrooptical schemes have been used to determine the part of the screen at which the gun is pointed. In one type of system, signals from a sensing circuit in the gun are compared with the phase of the vertical and horizontal raster-drive pulses to determine the position of the video electron beam at the instant it passes the gunsight. This comparison provides a very accurate location, but of course requires special wiring to pass synchronizing signals between the video display and the sensing circuit and computer analyzer.

In another type of system, the target is displayed as, for example, a light spot on a darker screen. The only light pulses that can come from the screen must therefore originate from the target spot. The gun receives and is programmed to respond to these light pulses. This system has the drawback that it is restricted to use with a relatively dark and static background displayed on the screen.

This system is also subject to interfering effects of extraneous optical signals in the room or other area where the game is used. These can be screened out by sensitizing the analysis circuit to pulses that contain the video line scanning frequency, or that occur at the scanning repetition rate, or both.

One such system is described by Steiger and Wahl in U.S. Pat. No. 4,205,847; they seem to suggest (column 3, lines 8 through 18) that such sensitization should be accomplished by synchronous demodulation. That technique, here again, is very accurate but requires wiring between the gun and the video-display unit for the synchronization.

In the past such wiring has been perhaps a slight nuisance in handling of the gun or other aiming unit. This is especially true for units that are best aimed from across a room, and for games in which two or more players pass the aiming unit back and forth.

Nevertheless such wiring has not been considered a great drawback, since connections for producing "hit" and scoring displays on the screen were desired anyway. More recently, however, the considerable cost of dedicated game computers—or of providing special circuitry for game adaptation of standard television sets—has made such wired-in systems unappealing in the market.

In a variant of this type of system, hard wiring between the gun or other aiming unit and the display screen is eliminated in favor of an infrared-beam or other wireless transmission of hit information to an electronics package that is part of the computer, attached to the screen. This variant is described in another patent of Steiger and Wahl, U.S. Pat. No. 4,210,329.

This approach does improve convenience in use of a target game, but as will be apparent it does not alleviate the considerable cost and cumbersomeness of providing and connecting the computer-and-electronics unit to serve as a game adapter for the video-display unit.

On the other hand, there is a different type of problem also associated with prior video target-game systems and video learning systems. As a general rule, the number of players who can play a particular game at the same time is limited.

This is effectively true even for the remote response unit of Steiger and Wahl, since the limiting factor arises in the number of inputs which the scoring system can handle within the framework of a single game. Interestingly, as a practical matter this limitation of the number of players is nearly independent of cost considerations, since game systems capable of receiving more than a very few simultaneous sets of inputs are essentially not on the market.

Another prior patent that may be related to our invention, although it appears to be in a different field, is U.S. Pat. No. 4,243,972 to Toussaint. That patent relates to identifying targets "among a field or group of targets"—and more particularly to distinguishing among such targets.

The Toussaint patent does not appear, however, to relate to games or learning systems, but rather to a video monitor used in lieu of a keyboard as an input device for a computer. For this purpose the monitor is used in combination with a light pen that is applied directly to the screen.

Such apparatus is well known in the context of computer systems for control of industrial process plants. In that context the various "targets" are simply used in place of keyboard keys, with the advantage that they can be superposed on diagrams of the plant piping or wiring.

The various targets can then represent various valves or switches to be operated remote-control by a plant operator at the video display, or for example they can represent various parts of the plant which the operator might like to see diagrammed in greater detail. The implication of touching the light pen to different parts of the screen thus varies with the portion of the system diagrammed on the screen.

Toussaint's disclosure suggests that it is such a system he has in mind. He says (column 4, lines 7 through 12, and lines 53 through 64; emphasis added): "By allowing the computer to recognize which character, area or location on the face of the CRT 1 has been selected by the positioning of pen 4, this method and apparatus makes [sic] possible a computer-user interaction without the need for other forms of user input devices . . .

"[T]he method entails . . . application of the pen to a selected target, area or location of the CRT screen . . . to control the computer."

Such a system as part of a process-plant control system may be typically priced upward of $100,000. It will be clear in any event that the Toussaint patent is not directed to the field of video games or learning systems.

From Toussaint's disclosure it is not clear why his targets are not simply distinguished from one another, as described above, by position of the raster beam. That is to say, his targets could have been identified by the phase of the vertical and horizontal san pulses—since his computer is hard-wired to his monitor anyway.

At the time of Toussaint's invention, however, the electronic hardware needed for real-time determination of raster phase was too new for use in a practical industrial system. Toussaint instead developed a system of coding the light pulses from his targets, for recognition by circuitry connected to his light pen. The "pen," really an optical receiver, is actuated by a lightly spring-loaded switch element, in the tip, adapted to be touched to the video screen.

His computer is programmed to cancel or suppress particular electron-beam scans, at the locations of multiple targets, thereby producing an "on-off status or blinking pattern" there. Different blinking patterns are used for different target areas, and the computer is programmed to analyze the signal from the optical receiver—testing for the particular blinking patterns in use.

None of the above patents suggests combining such coding with games (or learning systems) such as those of Steiger and Wahl. Further, none of these patents suggests that there could be any way to provide a video target game without attaching a game computer to a video display unit.

Yet there is a demand in the market for particularly economical video target games that can be used in the home without the cost and cumbersomeness of special wiring connections. The prior art fails to satisfy this demand.

SUMMARY OF THE DISCLOSURE

My invention is directed to solving exactly this problem and satisfying this demand. My invention is a video response apparatus, for use with a video tape. The tape has stored signals corresponding to an image of a scene that includes at least one target.

At least a part of each target has selected interlace fields removed. The result is, for each target, a respective distinctive periodic sequence of light pulses, associated with that target when that part of the target is displayed.

A substantially unmodified standard video cassette player is used to play the tape. A standard television receiver is connected for operation with the player to display the scene—particularly including omission of the selected interlace fields in each target, to provide as just explained a respective distinctive periodic sequence of light pulses associated with each target.

The response apparatus of my invention includes in particular a response module, which has no connection to or from either the video cassette player or the television receiver set. In fact, the response module has no output—by wire or by wireless—to either the player or television set.

The response module includes an electrooptical detector. The detector is sensitive to visible light at the intensity typically available from a television set at a distance up to at least ten or fifteen feet.

The response module must also include some means for receiving light from a limited portion of a scene displayed by the video receiver, and directing this light to the detector. For purposes of generality in expressing my invention, I shall refer to these means as the "imaging means."

The response module should also include some means to aid a user in pointing the imaging means to a particular limited scene portion—so that light from that limited portion is received and directed to the detector. Again for generality of expression, I shall call these means the "sighting means."

Also in the module there are some means for developing a detector output signal that is related to light directed to the detector. These means, once again, I shall call the "electronic means."

My invention also includes some means for analyzing the detector output signal. These "analyzing means" are distinct from the cassette player and from the television receiver, but they are responsive to the electronic means.

The analyzing means detect the presence, in light directed to the detector, of the distinctive periodic sequence of pulses associated with a target. The analyzing means perform this detection based upon the abovementioned absence of selected interlace fields.

The response module also includes some means for manipulation by a user in registering a particular scene portion for evaluation. Actuation of these "trigger means," as will be seen, is not necessarily a requirement for evaluation of every possible target type.

My invention also includes some means for communicating to a user whether a distinctive sequence is present in a registered scene portion,—based, again, on absence of selected interlace fields. These "communicating means," like the analyzing means, are distinct from the video cassette player and the television receiver; but are responsive to the analyzing means and the trigger means.

The foregoing may be a description of my invention in its broadest or most general form. I prefer, however, in the practice of my invention to incorporate various other advantageous features or characteristics which enhance or optimize performance, economy, or appeal of the invention.

For example, as will be seen, my invention can be used—and is used to particularly striking effect—with video-taped scenes that include not only the targets but also a great variety of other picture elements, either moving or stationary. When my invention is so used, the analyzing means readily detect the presence of the distinctive pulse sequences, and the communicating means communicate the results of this detection, irrespective of the presence or absence of such other picture elements.

Further, the communicating means preferably include cumulative scorekeeping means and an electronic display. These cooperatively indicate to a user a cumulative score, based (at least in part) upon a plurality of manipulations of the trigger means.

The analyzing means and communicating means may be housed in a separate module, which may for example be placed on or near the video screen. Such a separate module may receive signals by wire or wireless transmission from the response module. I prefer, however, for purposes of economy, simplicity and convenience to house the analyzing and communicating means within the response module.

The video tape with which my invention is used preferably has scenes including a plurality of target types. Each type is associated with a respective distinctive pulse sequence.

The analyzing means preferably include means for detecting the presence of each pulse sequence respectively— irrespective of presence or absence of the other target types and other pulse sequences. Preferably the analyzing means are capable of separate scoring for the different target types, each with respective scoring weights.

I prefer to include in the communicating means suitable sound effects to announce when the user has produced respectively a hit or a miss. In addition, I prefer to provide in conjunction with the sighting means a visual simulation of an explosion, so that a hit can be "rewarded" visually as well as acoustically—even though the module is not at all connected to the video display screen.

It will now be clear that my invention permits a video game to be played, or a video learning system to be operated, with an economical response module that is functionally as well as physically distinct from the video source. The response module can be small, in fact completely portable and handheld.

Yet it can recognize and respond appropriately to a variety of different target types. It can do so whether the targets are small or large, moving or stationary, simple or complicated in shape, and alone or sharing the display with other elaborate picture elements.

All that is needed to use the game or learning system of my invention are the response module and the video tape—and a completely conventional video cassette player and television set. If many response modules are available, many users can play at once, using in common just one tape, one tape player, and one television set.

My invention also encompasses the above-described method of automatically distinguishing and identifying specific limited portions of a video game or learning-system display, by automatically detecting (and communicating to a user) distinctive sequences of omitted video fields.

All of the foregoing operational principles and advantages of the present invention will be more fully appreciated upon consideration of the following detailed description, with reference to the appended drawings, of which:

BRIEF DESCRIPTION OF THE DRAWINGS

FIG. 1a is a plan view of graphic art, disposed in the sighting means of the FIG. 1 embodiment, to produce a visual explosion effect when a "hit" occurs.

FIG. 4 is a diagram showing pulse waveforms for various target types used in the preferred FIG. 1 embodiment. This pulse-waveform diagram also shows a normal or unmodified pulse waveform used for background features.

DETAILED DESCRIPTION OF THE PREFERRED EMBODIMENTS

Figure 1:
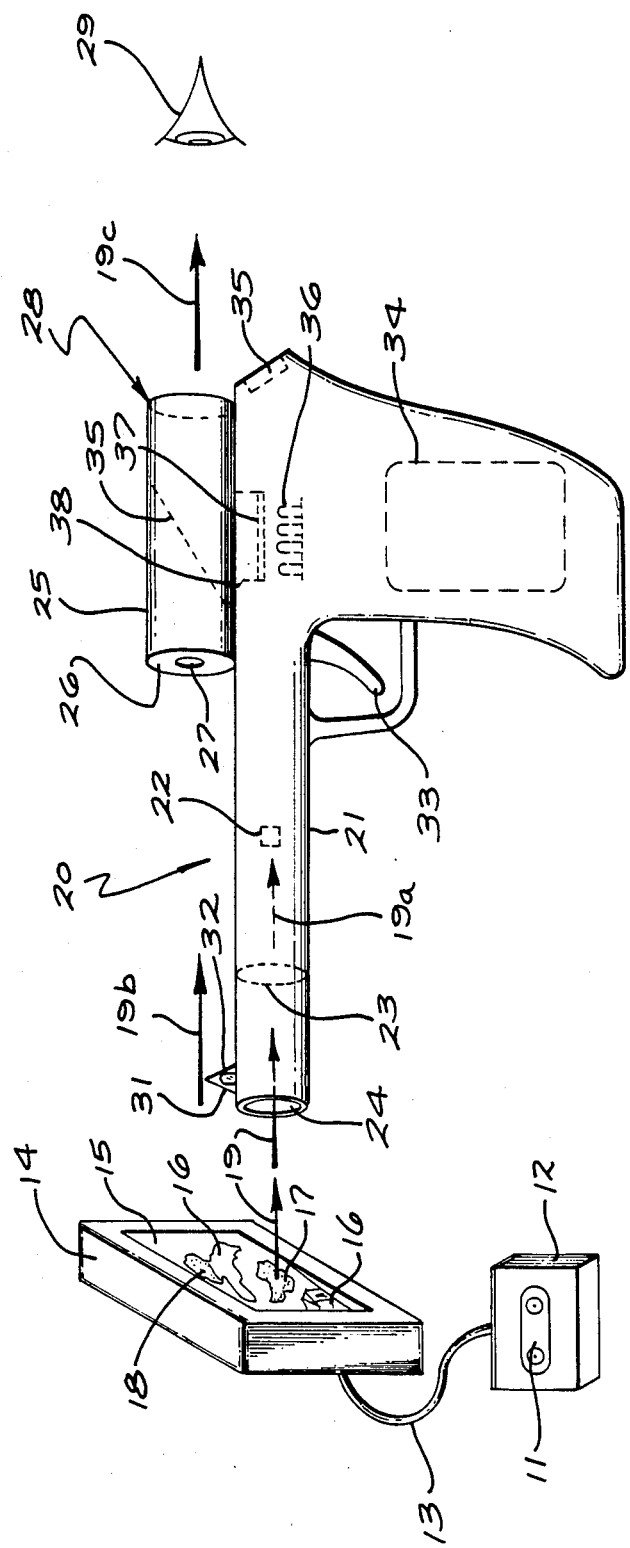
FIG. 1 is a somewhat schematic representation of a preferred embodiment of the entire stimulus-and-response system of my invention.

As shown in FIG. 1, my invention relates to an electronic toy or learning system that is used in conjunction with a prerecorded, specially coded video-tape cassette 11. The system includes a "gun" 20 that is to be pointed by a child or other user at one or more objects 17, 18 that are displayed (with background scene elements 16 if desired) on an ordinary television set 14. This display is produced through operation of a conventional cassette player 12, using an ordinary interconnecting cable 13.

The gun 20 also has a trigger 33, but the gun is not connected to the cassette player 12 or television set 14. In the gun are a lens 23 that receives light 19 emitted from the television screen 15, and images or at least concentrates the light at 19a onto a photocell 22.

The lens 23 and photocell 22 are disposed in the gun barrel 21 in known fashion to receive only light 19 emitted from a relatively small portion of the displayed image 16-17-18. The particular portion is selected by a user who points the gun as desired—within the constraints of his or her level of skill—at a desired part of the screen.

In this the user is aided by a forward sight boss 31 and a rear sight tube 25. Either end of the rear sight 25 advantageously has a window pane 26 carrying indicia 27 for alignment with the front sight 31 in aiming. Light 19b passes the front sight 31, traverses the rear sight 25 and proceeds as at 19c toward the user's eye 29.

The overall effect of the system operation is that the gun can distinguish between objects 16, 17 on the screen 15—or, if there is only one object (e.g., 17), the gun can distinguish between the object and the background scene elements 16. This effect is made possible by blinking one or more objects 17, 18 on and off in particular ways to be detailed below. The flashing is noticeable to the human eye 29, but can be made unobjectionable through judicious selection of blinking patterns.

As is well known, a television set has an electron beam that creates a luminous dot of varying intensity, which scans the complete screen fifty or sixty (depending on the video standards in use) times per second. The variations of intensity of the luminous dot as it moves produce shapes on the screen.

Only half of each picture—known as one "field"—is presented on each scan. The two fields or halves of each frame respectively contain alternate scan or raster lines, so that the two fields are interwoven or "interlaced."

In this way a full frame is presented only twenty-five or thirty times per second, but the two interlace fields create a desired flicker effect at fifty or sixty hertz. Thus as the scanning beam repeatedly passes any small bright portion of the displayed image, a series of short light pulses 91 (FIG. 4) emanates from that portion.

The time $T_i$ from the start of any one pulse 91a to the start of the next pulse 91b is the interlace-field period. It is either 1/60 or 1/50 of a second—that is to say, 16.7 or 20.0 milliseconds. The pulse repetition rate, or roughly speaking the pulse frequency, is accordingly the reciprocal: sixty or fifty hertz.

The time $T_f$ (FIG. 4) for two such pulses is the frame period, 1/30 or 1/25 of a second—i.e., 33.3 or 40.0 milliseconds. For light from a limited small portion of the screen, the actual duration $T_p$ of each pulse itself may be made typically, but very roughly, a millisecond.

This timing pattern is repeated indefinitely, a rapid flicker that interacts with the familiar "persistence" phenomenon of human vision to form the illusion of a continuous picture.

In my invention, however, certain selected interlace fields are deliberately removed from the target area or areas 17, 18. The result is a very distinctive time pattern of light pulses emanating from the target or targets, permitting ready discrimination between the target or targets and the background scene element(s) 16—whether the background is simple or complex, static or dynamic.

One possible pattern is created by removal of alternate interlace fields and thereby their corresponding light pulses as at 92b, 92d, 92f . . . (FIG. 4). What remains is a very distinctive flashing effect of narrow pulses 92a, 92c, 92e . . . repeating at twenty-five or thirty hertz, localized within the overall screen display that flashes at fifty or sixty hertz as above mentioned.

Other patterns can be created by removal of, for example, every third interlace field 93c, 93f, . . . ; or every fourth field 94d, 94h, . . . Here the results are extremely distinctive periodic flashing effects of asymmetric character—that do not correspond to any timing phenomenon normally found in a video image. These can be interpreted readily by a digital analyzer circuit.

It is not necessary to settle upon any one flashing pattern for use with my invention. Rather, if desired, a different pattern of interlace-field removal can be imposed upon different targets or groups of targets, permitting such discrimination between such different targets or groups. For example, pulse train 92 may be used for target 17 (FIG. 1), and pulse train 94 for target 18.

Still other flashing patterns can be used, including periodic removal of more than one consecutive interlace field. I prefer not to use such other patterns, although in principle they are equally distinctive and as readily created and processed as the individual-omitted-field patterns already discussed. I have found, however, that such other patterns produce a relatively annoying, coarse-appearing flicker.

In accordance with my invention, the gun contains circuitry 34 including wiring (not shown in FIG. 1) to the photocell 22 and other components, and also includes a microprocessor. The microprocessor is programmed to detect the particular pulse trains 92–94 created by the removal of selected interlace fields 92b, 93c, 94d, etc.

The trigger 33 is for manipulation by the user to signal to the circuitry 34 that a particular "aim" is, in effect, submitted for evaluation of accuracy. That is, the trigger 33 registers the immediately preceding pulse train for evaluation.

The microprocessor is programmed to respond with indications of a hit, if the trigger is pulled while the gun is pointed toward a particular flashing image. The microprocessor is also programmed to respond with indications of a miss, if the trigger is pulled while the gun is not pointed toward any of the flashing images.

The circuitry 34 preferably includes an audio amplifier and speaker (not shown in FIG. 1) operated by the microprocessor to generate distinctive audible hit and miss indications. In addition, the microprocessor calculates and displays numerical scores—using a bank of light-emitting-diodes 35, just below the rear port 28 of the sight tube 25, to form numerals.

For variety in scoring rules, it is also possible to program the microprocessor to recognize and respond to certain flashing patterns even when the trigger is not pulled.

Play situations can include arcade-type target games in which flashing images move across the screen and the child must aim and pull the trigger at the correct time. The gun counts the number of hits, and maintains a score. A digital display unit can display the score.

The system can also be used educationally. For example, for small children the screen can show enlarged images of an apple, a pear and an orange—with the orange flashing in one of the distinctive ways discussed above. A narrator asks, "Which fruit is the orange?"+If the child points at the orange and pulls the trigger, a "victory" sound is produced. For any other part of the screen, a "razz" sound is produced.

Yet another variant includes programming two or more different gun modules to respond differently to flashing patterns, so that different players have entirely different rules. For example, some players can be assigned to "shoot down" alien space ships attaching the earth, while other players can be appointed aliens and assigned to "shoot down" the earthlings' defending craft. A third group of players may be cosmic peace-keepers whose job is to create a protective force field around both types of craft by pointing at them and squeezing the trigger.

In such a situation there is some sensation of adversary play in a common game. In effect, however, the three groups of players simultaneously play three separate and different games. Each player's scoring is entirely independent of the others'.

None of the players can influence what is displayed on the screen or what the other players can accomplish. This unusual property of my invention permits many players to use a single video-game display or learning display at once—as many, in fact, as have response modules.

Thus the use of a cassette player and television receiver to play the video tape, and the cost of the tape itself, can be shared among a great number of players. As will now be appreciated, this feature of the invention solves a problem noted in my earlier discussion of prior art.

Within a single gun (or single response module), different flashing patterns can be associated by the processor with different scoring weights. For example, removal of every other field—pattern 92 in FIG. 4—can be associated with a score of a hundred points; removal of every third field (pattern 93) can be associated with a score of five hundred points. In designing each game, some targets may be made smaller or faster, so that it is sensible to award higher scores for successfully "hitting" them.

Yet another pattern 94 may be reserved for "shoot back" targets. When the gun is pointed at such targets the microprocessor immediately deducts points from the score, regardless of whether the trigger is pulled.

This programming creates some targets on the screen that in functional effect seem to "shoot back" at the player, so for best scoring the player must avoid even pointing the gun at such targets. In keeping with this concept the microprocessor can also be programmed to respond to a shoot-back target by blinking a small light-emitting diode 32 (FIG. 1) on the tip of the barrel 21—creating also a visual impression of the target 18 shooting toward the player's gun 20.

Another preferable feature is a "bonus" mode of operation. To create a higher skill level, this added rule can be programmed into the microprocessor: if the player hits five targets in a row without missing, the microprocessor shifts into the bonus mode. The bonus mode is announced by an alarm sound, and the hit and miss response sounds are enhanced.

In this mode the player is allotted five seconds in which to score double points. The existence of this mode creates an incentive to shoot carefully and not miss.

The microprocessor is also programmed to generate a red flash in the sight of the gun when a target is hit. This effect is achieved by energizing red light-emitting diodes 36 in a side passage of the sight 25—conveniently, below the sight axis, in the handle.

Within the sight 25, the flash of the diodes 36 appears superimposed upon the target 17, 18, by virtue of a pellicle mirror 35 in the sight. A suitable mirror 35 can be supplied very economically using semitransparent metallized plastic foil, such as that of the type available commercially under the trade name Mylar.

These arrangements create a visual suggestion of an explosion in the sight when a target is hit. I prefer to augment this effect by placing a translucent image of a sunburst pattern 37 (FIG. 1a) just above the diodes 36. Within the sight, it is desirable to bevel or round the corner 38 facing the user's eye 29, to reduce extraneous reflections.

An important feature of my invention is the appearance of the video-displayed image. Since video tape can be used, the game is not restricted to computer-generated images, although such images can be included to the extent desired. Real, camera-generated footage of physical objects can be used—as background 16, for instance—and a flashing-pattern target 17 or 18 superimposed on the real footage.

For example, the display can include video or cinematographic footage of a plane flying through a ravine, from the perspective of the pilot. Other planes can be superimposed as targets that fly across and around the screen.

Further, because the game is video-tape based, it can use real sounds and dialogue. Arcade or conventional home-video games, again, as a practical matter are restricted to computer-generated sounds.

All this represents a major improvement over standard arcade games that use solely computer-generated images, because with my invention the scenes and therefore the games seem much more realistic.

The distinctive pulse sequences associated with the targets are created by placing black video fields in the target areas of the recorded tape. This entails a relatively small variation of conventional "travelling matte" techniques that are generally familiar to those skilled in the art of electronic video editing.

The conventional part of the process creates in the background image a black area of the same size and shape as the target, moving exactly as the target will move. Then using a standard video "keyer" or matte device, the target image is positioned frame-by-frame into that black area.

The variation is that the target is not inserted into every field of the background—or, to put it another way, not every field of the target is used. Some fields of the background are left with the black area.

Thus the target is omitted from some fields of the background—or, again, some fields of the target are omitted, being replaced by the black spot. Standard video editing systems are not capable of this step, since they are configured or programmed, or both, to edit only on the basis of full video frames.

As noted previously, a full frame consists of two interlace fields: one field consists of even-numbered scan lines and the other field of odd-numbered lines. A standard video editor can omit both fields of a video frame, but not just one.

It is therefore necessary to provide somehow a timing signal for switching the target signal on and off, using the desired distinctive pulse sequence, field by field. This timing signal must be used to control an electronic video gate that is in the target-signal path somewhere upstream of the final matte combination process.

I shall now describe several approaches to this process. First, if desired the target signal can be pretreated to replace selected fields with black, and this modified target signal tape-recorded.

One technique for doing this is to first prerecord all-black fields on one video tape, and then play the target signal from a source video tape onto the all-black prerecorded tape—through the timing-signal-controlled gate, so as to transfer only the desired fields that are not to remain black. Another technique for accomplishing the same result is to record all-black fields through the timing-signal-controlled gate onto a tape recording of the target signal. In this latter technique the gate is operated from the timing signal with a polarity reversal, so that only the target fields which are to be omitted are erased and replaced with black.

Once a tape has been prepared—by either of these techniques—in which selected fields of the target signal are replaced with black, then the recorded pretreated signal can be used directly in the matte editor.

A second approach, which I prefer, skips the pretreatment step, placing the signal-controlled gate directly in the target-signal input path to the matte editor. Then the background scene is matted with the target(s) onto the master tape, while the gate omits selected target fields.

Within the target areas, normally, a conventional matte editor or keyer automatically supplies "color black" whenever a field is omitted. For an editor in which this is not the case, the tape which is to become the master, mixed tape can be first prerecorded with all-black fields.

Still other approaches, generally less advisable, involve preparation of the composite tape in a conventional matte procedure, followed by matte posttreatment of the composite tape to replace selected target fields with black in the target area. I consider such other approaches less desirable because they require more than one pass of the final composite tape with the same matte image. Such a procedure is likely to lead to noticeable registration errors—or undue costs to avoid such errors.

In any event I consider it highly desirable (though perhaps not absolutely necessary) to use some procedure that places "color black" signal in the omitted target-field areas, rather than to leave these areas unrecorded or literally "blank." Otherwise the optical modulation available for processing by the circuits in the response module or gun is significantly reduced, sometimes leading to target-recognition errors in operation.

The timing signal for control of the video gate can be generated in various ways. My own approach for producing prototype composite tapes was to use computer-generated video signals to record a timing-signal tape composed of full fields of white in the desired pulse sequence among full fields of black.

That is, one tape has alternating black and white fields; another has two white fields followed by a black field, and this pattern repeats continuously. Still another tape has three white fields followed by a black field, with this pattern repeating continuously; and so on.

I employed this approach for generating timing signals in my prototype work only because the facilities were at hand. For production work it may be more appropriate to use other techniques—such as building an electronic circuit, or programming a microprocessor, or simply programming and using a dedicated personal computer or the like—to generate the timing signal.

Selection of the best fields to omit is an important part of practical design. I shall now discuss some considerations that relate to selection of field-omission patterns.

It is desirable to program the microprocessor to identify two complete cycles of each pattern before "recognition" is permitted. Otherwise the identification process is likely to be flawed by coincidental effects that result from moving the detection area about on the video screen. It is therefore somewhat undesirable to use relatively long pulse-sequence patterns.

Two cycles of the shortest possible pattern 92 (FIG. 4)—namely, alternating present and absent fields—occupy four field periods, which is either about sixty-seven or eighty milliseconds, depending on the national video standard in use. The system can accordingly recognize this short pattern in less than a tenth of a second. That corresponds nicely with the time a user will require to visually, mentally and mechanically complete the aiming and firing process.

Two cycles of the next longer pattern 93, two fields on followed by one field off, require a total of six field periods, either 100 or 120 milliseconds. This pattern is long enough to require steadiness of aim—so that the target once found is kept at the center of the sight.

It furthermore may require some quickly-reacting users to deliberately delay actuating the trigger, to give the microprocessor sufficient time to recognize the target. Otherwise the processor will register a miss even though the gun is pointed at the target. Still, based upon actual experiments with a working system, I consider this amount of delay acceptable in practice.

To recognize two cycles of the next longer pattern 94 of the same type—three fields on and one off—the microprocessor must process eight fields, which takes either 133 or 160 milliseconds. I consider these times, over one-eighth of a second in the United States video standard system and nearly one-sixth of a second in the European system, marginally excessive for normal play.

Accordingly I have decided to use this four-field pattern for the shoot-back targets mentioned earlier. In this usage the trigger is not involved, and the microprocessor simply generates the shoot-back response whenever the user leaves the gun pointed at a shoot-back target for eight fields or longer. By assigning target patterns in this way I have thus effectively neutralized a potential problem in the otherwise unacceptable length of response time.

It is also possible to replace two or more consecutive fields in the target area with black, thereby making available at least one other relatively short pattern: one field on, followed by two off. This pattern can be recognized just as quickly, of course, as two on and one off.

Most people, however, perceive two consecutive blank fields as an annoying flicker pattern. I accordingly prefer to use only isolated black fields.

Figure 2:
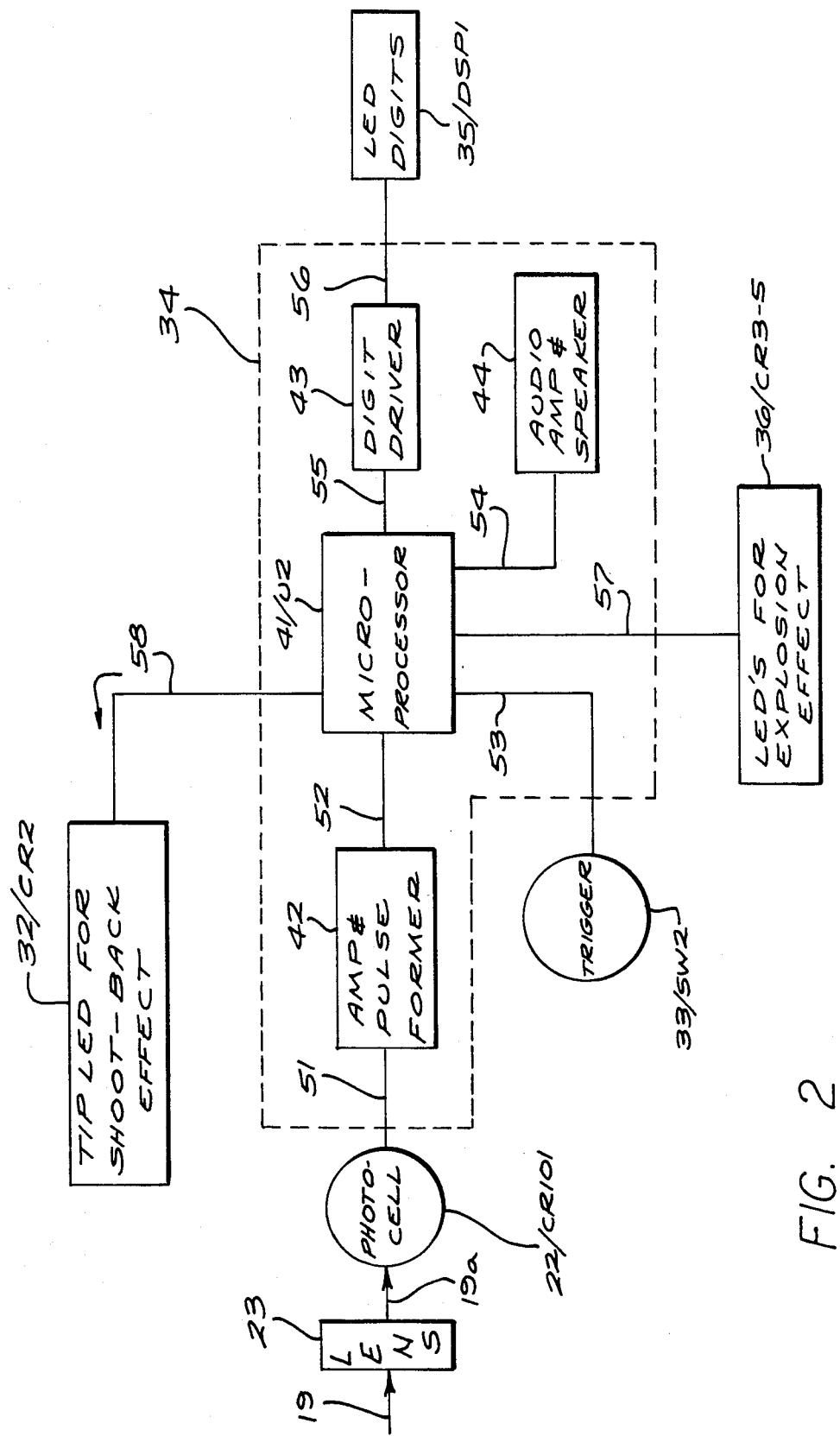
FIG. 2 is a block diagram of the response module for the FIG. 1 embodiment.
Figure 5A:
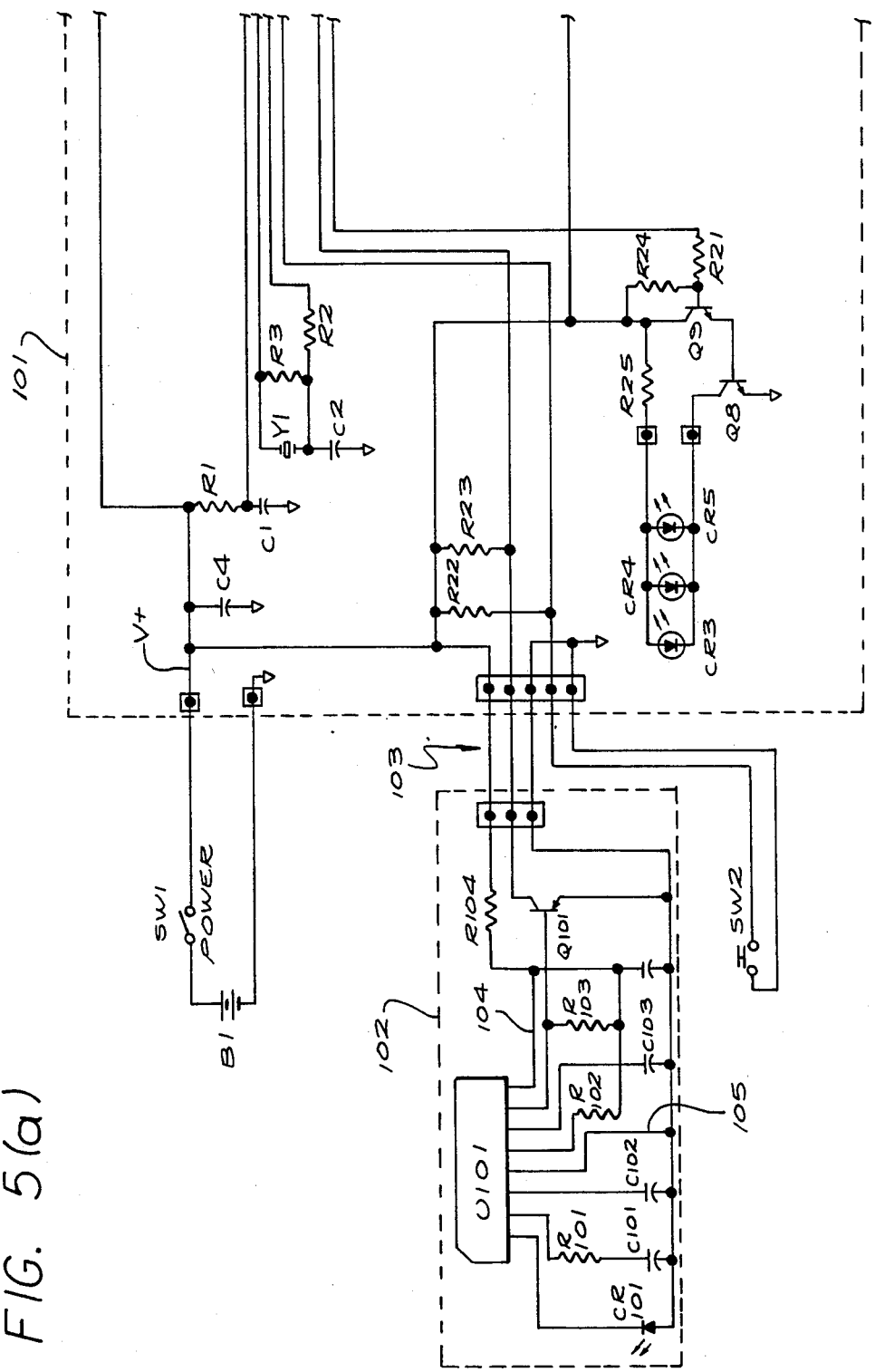
FIG. 5a and FIG. 5b, taken together, are an electronic schematic of the response module for the same embodiment.
Figure 5B:
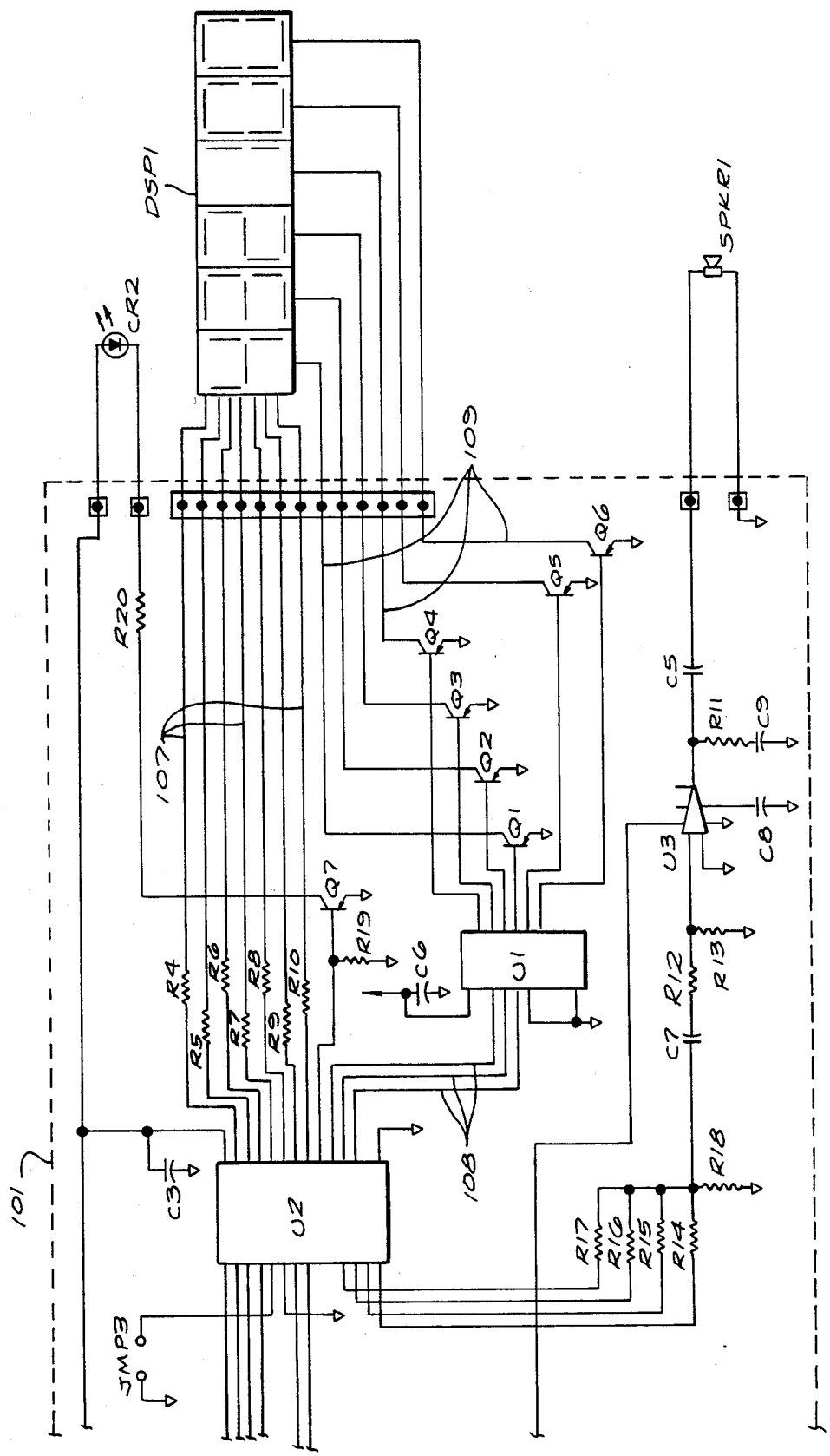

As shown in FIGS. 2 and 5, the circuitry 34 required for operation of my invention is relatively modest and simple. It has only two inputs, both appearing at the left end of FIG. 2.

One of these is the photocell 22/CR101. (This notation is meant to suggest that the physical object is identified as 22 in FIG. 1, and the circuit element as CR101 in FIG. 5.) As mentioned earlier, the photocell receives light 19a from the lens 23. In operation of my invention, this light 19a includes light pulse trains such as 91–94 of FIG. 4.

In response the photocell develops a corresponding electrical signal 51, which includes electrical pulses substantially proportional to the optical pulses—but in general somewhat distorted by various interfering effects. The electrical pulses pass at 51 to an amplifier and pulse-former circuit 42, which produces corresponding pulses suitable for use as microprocessor input signals. These buffered and shaped pulses proceed at 52 to the microprocessor 41/U2.

The other input is the trigger and mechanically associated switch 33/SW2. When operated by the user, the trigger and switch supply a switch-closure signal at 53 to the microprocessor 41/U2.

The microprocessor in turn, based on a stored program, operates the several output devices illustrated in FIG. 2. Of these devices, the most important to learning processes or game play are the audio amplifier and speaker 44, and the "LED digits" or light-emitting-diode numeral bank 35/DSP1.

The microprocessor 41/U2 controls the audio amplifier and speaker 44 through a signal bus 54. It controls the "LED digits" 35 through signal buses 55 and 56 to and from an intermediate digit-driver circuit 43.

Secondary outputs are the "LEDs for explosion effect" 36/CR3-5 and the "tip LED for shoot-back effect" 32/CR2, which are actuated through buffered signal lines 57 and 53 respectively. These light-emitting diodes produce the effects previously indicated when a user pulls the trigger after a positive-scoring target has been detected by the microprocessor—or when a user points the gun toward a shoot-back or negative-scoring target.

Figure 3:
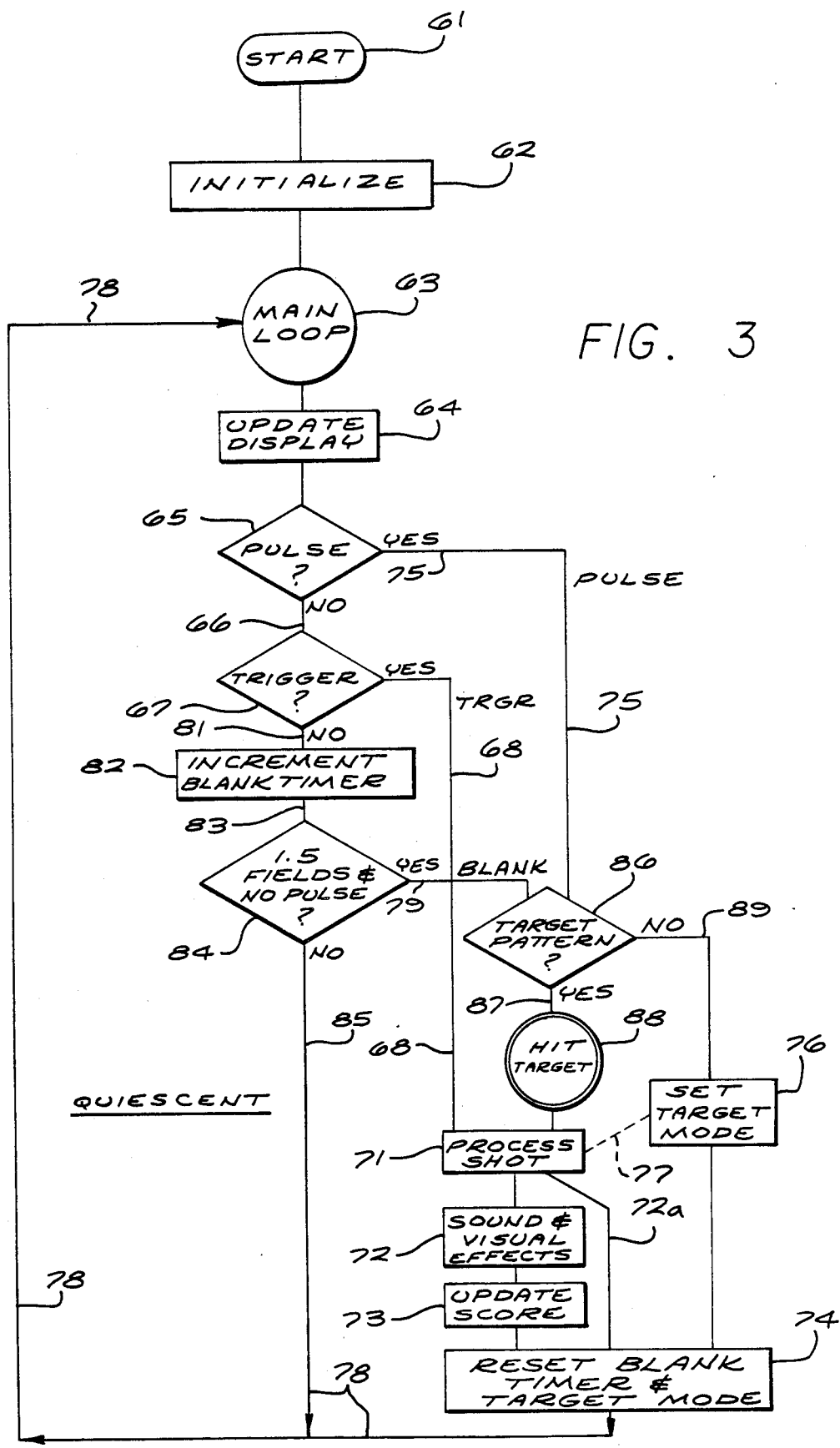
FIG. 3 is a flow chart showing operation of the software used in the FIG. 1 embodiment.

As shown in FIG. 3, the overall cycle of the microprocessor program has four main branches: trigger response at 68, pulse response at 78, blank response at 79, and quiescent at 85. The first three of these branches rejoin in the target- and shot-evaluation section 71–77, 86–89, of the program.

Upon startup 61 by application of power to the apparatus, the condition of the microprocessor is systematically initialized 62 and it enters 63 its main program loop. The first action within this loop is to update 64 the display unit 35/DSP1—so that, for example, when the module is first turned on it displays zero score.

Next the microprocessor tests 65 for the presence of a pulse. As will be recalled, the pulse widths occupy at most only about one sixteenth or one twentieth of the video field period, and pulses are not present in every field.

Hence the most frequently followed route from the pulse test is its negative branch 66. In this path the microprocessor next tests 67 for a switch closure at the trigger 33/SW2.

Such a closure is generated by action of the user and may occur at any time, but is perhaps relatively unlikely when the device is first turned on. Consequently the most probable route on the first pass through the main loop is the negative branch 81 from the trigger test.

Here the microprocessor increments 82 a memory register that has been assigned to time the blank intervals between pulses, and which I shall call the "blank timer" register. The microprocessor then proceeds 83 to test 84 for an accumulation of 1.5 field periods without an observed pulse. That is, the processor reads the "blank timer" register which was just incremented, to determine whether enough time has elapsed to conclude that there must have been a blank in the pulse train.

When first turned on, since the processor reaches the 1.5-field test 84 in a fraction of a millisecond, the result of this test will be negative. The program will accordingly follow its negative or quiescent branch 85 to the main-loop return 78, and will restart into the main loop at 63. At startup the microprocessor is likely to follow this same path a number of times.

If the response module is pointed at an operating video display, the next most likely chain of events corresponds to reception of light pulses from some background portion of the displayed scene rather than a target. That is, the microprocessor, after repeatedly following the negative branch 85 from the 1.5-field test 84, will eventually encounter a positive test 65 for a pulse. Following the pulse-response branch 75, it will test 86 for a target pattern. If the response module is "looking" at a background element, the target-pattern test 86 will fail, and the microprocessor will follow its negative subbranch 89.

It will next set 76 a memory register that has been assigned to store the target mode. In the case under discussion, the microprocessor will set this target-mode register to "none," before proceeding through the "reset blank timer and target mode" block 74 (without change) to the recycle path 78.

The microprocessor will then make a number of passes through the quiescent branch 85 as previously described, until the time for the next pulse. As long as the response module continues to be pointed only toward background elements of the video display, the "blank timer" will always be reset 74 before it can accumulate the number of clock cycles corresponding to 1.5 video fields.

That is, the blank timer will not be permitted to advance to the number of clock cycles corresponding to an omitted pulse or "blank." The microprocessor accordingly will continue to use only the quiescent branch 85 from the 1.5-field test 84 and (in roughly every seventeenth or twentieth pass) the negative subbranch 89 from the target-pattern test 86.

During such operation if the trigger is actuated when there is no pulse, the microprocessor will follow the positive branch 68 from the trigger test 67. On this branch the microprocessor will evaluate or process 71 the user's "shot."

This option is locked out by operation of the pulse test 65 whenever the processor is busy processing a pulse. As noted earlier, however, the pulses occupy only a small portion of the overall video cycle, and only for about one millisecond at a time. As one squeeze of the trigger spans many milliseconds, it is not possible for the processor to overlook a trigger-switch closure during the "lockout."

In processing 71 of a shot, the microprocessor determines whether it has detected a hit—that is, whether the module has been pointed toward a target—and if so determines which target type is involved. Under the conditions outlined above, the microprocessor must find in the shot-processing 71 procedure, by testing the previously mentioned "target mode" memory register (dashed information line 77), that the target mode has been set 76 to "none."

Accordingly in the next step—generation 72 of sound and visual effects—the microprocessor develops an acoustic indication of a miss (e.g., as previously suggested a "razz" sound). It then proceeds to update 73 the displayed score, in this instance requiring no change.

The microprocessor next clears the registers assigned to serve as "blank timer" and to store the target mode. It then again recycles 78 into the main loop at 63.

Of course the more interesting logic paths are those corresponding to detection of targets. All of these necessarily entail detection of a missing pulse or "blank."

The microprocessor identifies a blank by recognizing that it has failed to detect a pulse when it is time for a pulse—or, in other words, by counting through a sufficient number of clock cycles without detecting a pulse. The portions of the program directed to this process are the "increment blank timer" block 82 and the "1.5 fields and no pulse?" test block 84.

When the "blank timer" count reaches a high enough value to represent approximately one and a half interlace-field periods $T_i$ (FIG. 4), the "1.5 fields" test 84 must yield a positive value. The microprocessor then follows its "blank" branch 79 to the target-pattern test 86.

If this blank is the first after a long series of preceding consecutive pulses, the processor of course cannot yet identify any particular target pattern, but can recognize and record in its memory that a target-pattern sequence may have begun. Since there is not yet a recognized pattern, the microprocessor uses the negative subbranch 89, sets 76 the target-mode register to "some target pattern" and proceeds to reset 74 the blank-timer register (but not the target mode).

After cycling through the pulse, quiescent, and blank branches several more times—but now retaining the contents of the target-mode register on each pass—the microprocessor will be able to accumulate enough information to identify a particular target-pulse sequence or "target mode."

In these circumstances, however, it is possible that the gun is being moved about relative to the video display in such a way that no identifiable target mode can be established. In such a case, as soon as the "target pattern" test 86 receives the first pulse or blank input that is inconsistent with the previous tentatively stored target mode, the target-mode register will be reset 76, 74 to "none" and the processor will resume operation in that condition.

The processor is programmed to require two full cycles of a particular target pulse pattern before accepting the pulse-and-blank sequence as a target pattern and identifying which pattern it is. If that does occur, the target-pattern test 86 leads to its positive subbranch 87, and this condition is stored 88 as a hit.

Unless the detected target mode is "shoot back," the microprocessor at this point generates no perceptible output in response to the recognition 86 and storage 88 of a hit. Rather the processor bypasses at 72a the annunciator blocks 72 and 73, resets 74 the blank timer (but not the target mode), and recycles 78 into the main loop at 63.

As long as the response module remains pointed at a target of the same type, the processor continues to cycle through the pulse and blank branches 75, 79—confirming at each pass the target-mode setting 77 and hit status 88. At any time in this procedure, as suggested above, if the gun is moved so that it no longer points at the same type of target, the hit status will be cancelled and the target mode reset 74.

If instead, however, the user actuates the trigger, then the processor will follow its trigger branch 68 to the shot-processing procedure 71. Now the coincidence of a trigger input 68 with confirmation 88 of hit status will carry the microprocessor into generation 72 of sound and visual effects appropriate to a hit, and an appropriate increase 73 of the user's score. These effects include the visual simulation of an explosion, and a distinctive audio output suggesting a successful hit, all as mentioned previously.

Following this activity the microprocessor again resets 74 the blank-timer and target-mode registers, again restarts 78, 63 into the main loop and updates 64 the display with the newly computed 73 score. It is then ready for resumption of play.

Two other possible paths for operation of the microprocessor remain to be discussed. First, the processor may identify 86, 76, 88 a shoot-back target: in this case the shot-processing step 71 proceeds irrespective of input 68 from the trigger test 67, and in fact without the necessity for recycling through the pulse, trigger and 1.5-fields tests 65, 67, 84.

The processing 71 of a shot in this case, however, produces (at 72) different sound and visual effects—namely a distinctive audio output suggesting that a shoot-back target is firing at the user, and excitation of the light-emitting diode 32/CR2 at the forward sight to augment that suggestion. Moreover the processor then updates 73 the user's score by deducting points, before resetting 74 the blank-timer and target-mode registers and recycling into the main loop to display 64 the reduced score and resume play.

Secondly, the microprocessor may be programmed to keep track of the number of successful shots in a row—without shoot-back activity—and (upon satisfaction of some criterion) to shift into a special bonus mode in which scoring is enhanced for a specified interval. This option is not illustrated, but based upon the foregoing disclosure its implementation will be straightforward for those skilled in the art of microprocessor programming.

I shall return now to discussion of the electronics in my preferred embodiment. Additional details appearing in FIG. 5 include mechanical arrangements for support and interconnection. The main logic board 101 is housed in the handle of the response module, while the photocell board 102 is advantageously disposed in the barrel—so that the photocell CR101 can be connected directly to immediately adjacent electronics.

A short cable 103 interconnects the photocell board 102 with the main logic board 101. Also separate from the main board 101 but connected through short cables are a power switch SW1 and battery holder B1, the trigger switch SW2, the tip light-emitting diode CR2, the score-display unit DSP1, and the audio speaker SPKR1.

The power switch SW1 and battery holder B1 are connected with a power bus V+ and a ground bus on the main logic board 101. All of the other components are of course supplied from these buses.

On the photocell board are the photodiode CR101, with its integrated-circuit regulated power supply and preamplifier U101. The latter receives voltage at 104 from the power bus V+ through a noise filter R104-C104, and bias voltages developed at the top (as drawn) ends of resistors R101 and R102 and capacitor C102. The photodiode preamplifier U101 is also grounded within the photocell board at 105.

One end of an output load resistor R103 carries the output signal from the preamplifier U101, which is passed to the base of a buffer transistor Q101. The output signal from the collector of this transistor Q101 leaves the photocell board 102, proceeding by the cable 103 to the main logic board 101 where it is applied to one input terminal 111 of the microprocessor U2. This terminal is held at a high voltage through a bias resistor R23 when there is no pulse from the photocell board 102.

Similarly the trigger switch SW2 is wired to the main logic board 101 and there connected to an input terminal 12 of the microprocessor U2. This terminal is held high through a bias resistor R22 when the trigger switch SW2 is open.

Within the main logic board 101, the microprocessor U2 is supplied with battery voltage filtered at C3, and is also connected with a piezoelectric crystal Y1, which provides stable clock pulses for sequencing of the microprocessor. When power is first turned on, a single pulse through R1-C1 provides for orderly initialization of the microprocessor condition.

The microprocessor U2 operates the audio speaker SPKR1 by synthesizing audio frequencies from trains of square waves. These are summed in a voltage-reducing resistive divider R14–R18, in which the four digital input lines from the processor U2 have different contributory implications by virtue of their different divider resistors. This permits digital-to-analog conversion for simple volume-control effects such as "attack and decay." The resulting output waveform is a. c.-coupled at C7-R12-R13 to an audio amplifier U3.

The amplifier in turn is a. c.-coupled at C5 to drive the speaker SPKR1. There is some R-C filtering effect at C7-R12-R13 and C5-C6-R11, tending to round the corners of the square waves from the divider to provide smoother waveforms for excitation.

Microprocessor operation of the six-digit score-display unit DSP1 is implemented in a customary fashion by a seven-line digit-segment signal bus 107 and a three-line digit-selector bus 108. The segment bus, following diode current limitation in resistors R4-R10, is cabled directly to the display unit DSP1, one line operating each of the seven segments needed to assemble numeral shapes.

Signals on the digit-selector bus 108, its three binary lines capable of selecting up to $2^3=8$ digits, are first decoded in an integrated-circuit decoder U1 to provide six individual clock or "strobe" signals. These pass through six respective buffering or power transistors Q1-Q6. The six transistor output signals 109 are cabled (along with the segment lines 107) to the score-display unit DSP1, to respectively actuate the six digits of the display.

In simpler fashion the microprocessor U2 operates the three explosion-effect diodes CR3-CR5 in parallel, through two transistors Q8, Q9 forming a buffer or power amplifier. The microprocessor similarly operates the single tip-located shoot-back diode CR2 through a single buffer or power transistor Q7.

The microprocessor U2 is programmed in such a way that the variation (roughly plus-or-minus ten percent) in interlace-field time periods between European and U.S. video standards does not influence operation of the response module. That is, the system in effect ignores timing variations of this low magnitude.

To make the system accurately compatible, however, with European (fifty hertz) video standards, known in the industry by the acronyms "SECAM" and "PAL," the system shown in FIG. 5 includes provision for placement of a jumper wire—at a connection point JMP3.

A great variety of circuit components may be used in the FIG. 5 circuit. Merely as examples, however, I present the following listing of component values and commercial identifying numbers that I have found to work acceptably.

| U1 | 4028B | | |
|---|---|---|---|
| U2 | COP420L | | |
| U3 | LM386 | | |
| U101 | IR3T07 | | |
| Y1 | 3.58 MHz | | |
| SPKR1 | 8 ohm | | |
| DSP1 | 6-digit LED | | |
| CR1-CR5 | red LED | R11 | 10 |
| CR101 | OP500 | R12 | 51 k |
| Q1-Q9, Q101 | 2N3904 | R13 | 4.7 k |
| C1 | 0.1 | R14 | 10 k |
| C2 | 27 pf | R15 | 20 k |
| C4* | 200 (10 V) | R16 | 36 k |
| C3 | 0.33 | R17 | 75 k |
| C5 | 200 (10 V) | R18 | 10 k |
| C6 | 0.047 | R19 | 2 k |
| C7 | 0.33 | R20 | 100 |
| C8 | 10 (10 V) | R21 | 620 |
| C9 | 0.1 | R22 | 1 k |
| C101 | 1 | R23 | 4.7 |
| C102 | 3.3 | R24 | 10 k |
| C103 | 1000 pf | R25 | 22 (¼ W) |
| C104 | 10 | R26 | 22 |
| R1 | 100 k | R101 | 22 |
| R2 | 1 k | R102 | 390 k |
| R3 | 1 M | R103 | 10 k |
| R4-R10 | 100 each | R104 | 100 |
| B1 | 6 V (four AA akaline batteries) | | |

In this tabulation except where otherwise indicated, all resistor values are stated in ohms and all capacitor values in microfarads. Certain resistor values are subject to final adjustment to control brightness of light-emitting diodes in the system: R20 for the shoot-back indicator CR2 is the forward sight, R25 for the hit indicator CR3-CR5 under the pellicle mirror, and R4-R10 for the exterior score-display array DSP1.

It will be understood that the foregoing disclosure is intended to be merely exemplary, and not to limit the scope of the invention—which is to be determined by reference to the appended claims.

I claim:

1. A video response system, for use with an unmodified standard video cassette player and a standard television receiver connected for operation with such a player; said response system comprising:

a video tape for playback on such video cassette player to display images on such receiver, said tape having stored signals corresponding to sequential images of a scene that includes at least one moving target; said moving target having a detailed internal image, and said signals including detailed internal target-image information for display of said detailed internal image within said moving target;

said target-image information, for at least a portion of said moving target, having selected interlace fields removed to provide, upon display, a distinctive periodic sequence of light pulses;

said light-pulse sequence, for said moving-target portion, consisting of a distinctive periodic sequence of pulses of said detailed internal image within said moving-target portion;

a response module having no connection to or from, and no output to, either such video cassette player or such television receiver; and having no parts in common with either such video cassette player or such receiver;

an electrooptical detector in the module;

imaging means in the module for receiving and directing to the detector light from a limited portion of said scene displayed by such receiver;

sighting means, forming part of the module, to aid a user in pointing the imaging means to receive and direct light from a particular limited scene portion to the detector;

electronic means in the module, responsive to the detector, for developing a detector output signal related to, light directed to the detector;

means, distinct from such video cassette player and such television receiver, but responsive to the signal-developing electronic means, for analyzing the detector output signal to detect presence, in light directed to the detector, of said distinctive periodic sequence of pulses of said internal detailed image of said moving-target portion, based upon absence of said selected interlace fields;

trigger means in the module for manipulation by a user in registering a particular scene portion for evaluation; and means, distinct from such video cassette player and such television receiver, but responsive to the analyzing and trigger means, for communicating to a user whether said distinctive sequence is present in a registered scene portion, based upon absence of said selected interlace fields from said internal detailed image of said moving-target portion.

2. The response apparatus of claim 1, wherein: the analyzing and communicating means are also within the module.

3. The response apparatus of claim 1, wherein:

said video tape stored signals correspond to images of a scene that includes other picture elements in addition to said moving target; said target moving among such other picture elements;

the analyzing means comprise means for detecting presence of said distinctive sequence from said moving-target portion if said portion is received and directed by the imaging means, irrespective of presence or absence of said other picture elements in said received particular limited scene portion, and irrespective of motion of said target portion among said other picture elements, and irrespective of any similarities between said other picture elements and said detailed internal image; and the communicating means comprise means for communicating to a user whether a distinctive sequence is present irrespective of presence or absence of said other picture elements in said received particular limited scene portion, and irrespective of motion of said target portion among said other picture elements, and irrespective of any similarities between said other picture elements and said detailed image.

4. The apparatus of claim 3, wherein:

said other picture elements in said scene include images of actual physical objects recorded with a video or cinematographic camera;

in such displayed scene, said moving target, having a detailed internal image, is superimposed upon and appears to move among said camera-recorded actual physical objects; and in operation of the response apparatus, the analyzing and communicating means are substantially nonresponsive to presence or absence of such camera-recorded actual physical objects in such scene, and to any similarities between said camera-recorded objects and said detailed internal image of said target.

5. The response apparatus of claim 1, wherein:

the communicating means include cumulative scorekeeping means and an electronic display that cooperatively indicate to a user a cumulative score based upon a plurality of manipulations of the trigger means.

6. The apparatus of claim 1, wherein:

said video tape stored signals correspond to scenes that include a plurality of moving-target types which generally move among each other, each type having a respective detailed internal image and a respective distinctive pulse sequence; and the analyzing means comprise means for detecting presence of each distinctive pulse sequence respectively if the corresponding respective target is received and directed by the imaging means, irrespective of motion of said target among each other, and irrespective of presence or absence of the other pulse sequences, and irrespective of any similarities between the respective detailed internal images.

7. The response apparatus of claim 6, wherein:

the communicating means include cumulative scorekeeping means and an electronic display that cooperatively indicate to a user a cumulative score based upon a plurality of manipulations of the trigger means; and the scorekeeping means are responsive to the analyzing means and assign particular scoring weight to each distinctive pulse sequence respectively.

8. The apparatus of claim 7, wherein:

each said moving-target type has an associated respective pulse sequence that includes a respective specific number of light pulses followed by one omitted pulse;

the analyzing means detect a periodic sequence of each respective specific number of light pulses followed by one omitted pulse; and the scorekeeping means assign a respective positive or negative scoring weight to each respective specific number of light pulses followed by one omitted pulse from the corresponding moving-target type.

9. The apparatus of claim 1, wherein:

said video tape stored signals correspond to images of a scene that has at least one moving target, having a detailed internal image, for which alternate interlace fields are removed to provide a sequence of light pulses at a full-frame rate; and the analyzing means detect a sequence of light pulses at the full-frame rate from said moving target, if that target is received and directed by the imaging means, irrespective of motion of that target.

10. The apparatus of claim 1, wherein:

said video tape stored signals correspond to images of a scene that has at least one moving target, having a detailed internal image, for which every third interlace field is removed, to provide a periodic sequence of two light pulses followed by one omitted pulse; and the analyzing means comprise means for detecting a periodic sequence of two light pulses followed by one omitted pulse from said moving target, if that target is received and directed by the imaging means, irrespective of motion of that target.

11. A video stimulus-and-response apparatus, comprising:

a video tape having stored signals corresponding to sequential images of at least one scene that includes at least one moving target having a detailed internal image, at least a portion of each target having a selected interlace fields removed to provide a respective distinctive periodic sequence of light pulses associated with that target when displayed, said light pulses being pulses of said detailed internal image of said moving target;

a substantially unmodified standard video cassette player for playing said tape;

a substantially unmodified standard television receiver connected for operation with the player to display said scene;

a response module having no connection to or from, and no output to, and no components in common with, either the video cassette player or the television receiver;

an electrooptical detector in the module;

imaging means in the module for receiving and directing to the detector light from a limited portion of said a scene displayed by the receiver;

sighting means, forming part of the module, to aid a user in pointing the imaging means to receive and direct light from a particular limited scene portion to the detector;

electronic means, disposed within the module and responsive to the detector, for developing a detector output signal related to light directed to the detector;

means, distinct from the video cassette player and the television receiver but responsive to the detector, for analyzing the detector output signal to detect the presence, in light directed to the detector, of said distinctive periodic sequence of pulses of the detailed internal image of said moving target, based upon absence of said selected interlace fields;

trigger means for manipulation by a user in registering a particular scene portion for evaluation; and means, distinct from the video cassette player and the television receiver but responsive to the analyzing and trigger means, for communicating to a user whether a distinctive sequence is present in a registered scene portion, based upon absence of said selected interlace fields from the detailed internal image of said moving target.

12. The apparatus of claim 11, wherein:

the communicating means include, entirely within the response module, cumulative scorekeeping means and an electronic display that cooperatively indicate to a user a cumulative score based upon a plurality of manipulations of the trigger means.

13. The apparatus of claim 12, wherein:

said video tape has at least one moving target, having a detailed internal image, for which every third interlace field is removed, to provide a periodic sequence of two light pulses followed by one omitted pulse, said light pulses consisting of pulses of said detailed internal image; and the analyzing means comprise means for detecting a periodic sequence of two pulses of said internal image followed by one omitted pulse, irrespective of motion of said target, if said target is received and directed by the imaging means.

14. The apparatus of claim 12, wherein:

said video tape that has at least one moving target, having a detailed internal image, for which every fourth interlace field is removed, to provide a periodic sequence of three light pulses followed by one omitted pulse, said light pulses consisting of pulses of said detailed internal image; and the analyzing means detect a periodic sequence of three pulses of said internal image followed by one omitted pulse, irrespective of motion of said target, if said target is received and directed by the imaging means.

15. The apparatus of claim 12, wherein:

the electronic display is associated with the sighting means, in such a way that the score is visible to a user during said pointing of the imaging means to receive light from a portion of a displayed scene with aid of the sighting means.

16. The apparatus of claim 11, wherein:

said video tape stored signals correspond to an image of at least one scene that includes other picture elements in addition to said moving target; and said moving target moves among said other picture elements;

the analyzing means comprise means for detecting presence of said distinctive pulse sequence irrespective of presence or absence of said other picture elements in said particular limited scene portion, and irrespective of motion of said target among said other picture elements; and the communicating means comprise means for communicating to a user whether a distinctive sequence is present irrespective of presence or absence of said other picture elements in said particular limited scene portion, and irrespective of motion of said target among said other picture elements, and irrespective of any similarity between said other picture elements and the detailed internal image of said target.

17. The apparatus of claim 16, wherein:

said other picture elements include images of actual physical objects recorded with a video cinematographic camera;

in said displayed scene, said moving target, having a detailed internal image, is superimposed upon and appears to move among said camera-recorded actual physical objects; and in operation of the stimulus-and-response apparatus, the analyzing and communicating means are substantially nonresponsive to presence or absence of said camera-recorded actual physical objects in said scene, and to any similarity between said detailed internal image and said objects, and to motion of said target among said objects, provided that said target is received and directed by the imaging means.

18. The apparatus of claim 11, wherein:

said video tape that has scenes including a plurality of moving targets types having respective detailed internal images and respective associated pulse sequences, said target types moving among each other; and the analyzing means comprising means for detecting the presence of each distinctive pulse sequence from any of said moving targets respectively, irrespective of presence or absence of such other pulse sequences, and irrespective of motion of said targets among each other.

19. The apparatus of claim 18, wherein:

the communicating means include, entirely within the response module, cumulative scorekeeping means and an electronic display cooperatively indicate to a user a cumulative score based upon a plurality of manipulations of the trigger means; and the scorekeeping means are responsive to the analyzing means and assign particular scoring weight to each distinctive pulse sequence from such moving targets respectively.

20. The apparatus of claim 19, wherein:

each moving target type is associated with a respective pulse sequence that includes a respective specific number of light pulses followed by one omitted pulse;

the analyzing means detect a periodic sequence of each respective number of light pulses followed by one omitted pulse, said light pulses consisting of pulses of said detailed internal image; and the scorekeeping means assign a respective scoring weight to each respective specific number of pulses of said internal image followed by one omitted pulse.

21. The apparatus of claim 20, wherein:

at least one respective scoring weight is positive and at least one is negative.

22. The apparatus of claim 19, wherein:

with regard to at least a particular one of said plurality of distinctive sequences, the communicating means also communicate to a user whether that sequence is present in a scene portion irrespective of manipulation of the trigger means;

whereby the communicating means include at least that one particular distinctive sequence in the cumulative score whether or not the particular scene portion is registered for evaluation.

23. The apparatus of claim 22, wherein:

each moving target type is associated with a respective sequence that includes a respective specific number of light pulses followed by one omitted pulse, said light pulses consisting of pulses of said detailed internal image;

the analyzing means detect a periodic sequence of each respective number of pulses of said detailed internal image followed by one omitted pulse, irrespective of motion of said target, if said internal image is received and directed by the imaging means;

the scorekeeping means assign a respective scoring weight to each respective specific number of pulses of said internal image followed by one omitted pulse, including at least one respective scoring weight that is positive and at least one that is negative; and said at least one particular distinctive sequence has a negative scoring weight.

24. The apparatus of claim 11, wherein:

said video tape has stored signals corresponding to at least one moving target that has a detailed internal image for which alternate interlace fields are removed to provide a sequence of light pulses at a full-frame rate; and the analyzing means detect a sequence of pulses of the internal image of said target at the full-frame rate, irrespective of motion of said target, if the target is received and directed by the imaging means.

25. The apparatus of claim 11, wherein:

the communicating means includes visible means associated with the sighting means, for superimposing upon said displayed scene, as viewed with the sighting means, a visual simulation of an explosion when said distinctive sequence from a moving target containing a detailed internal image is present in a registered scene portion.

26. The apparatus of claim 11, wherein:

the response module is portable and handheld.

27. A method for automatically distinguishing and identifying specific limited moving portions, containing detailed internal images, of a video game or video learning-system display, comprising the steps of:

obtaining a video recording which carries video signals corresponding to scenes with limited moving portions that contain detailed internal images; said internal images having selected interlace fields removed to provide a distinctive sequence of pulses of said detailed internal images in said limited moving portions;

then playing the video recording on a substantially standard video recording player to produce said game or learning-system display, including said scenes, and limited moving portions with distinctively pulsed detailed internal images therein, on a substantially standard television receiver;

during said playing step, aiming at specific limited portions of the display an automatic optical receiving device that has no parts in common with the player or receiver, is not connected with the player or receiver, does not depend for its operation in said method upon providing an output signal of any kind to the player or receiver, and is disposed at a distance from the receiver;

during said playing and aiming steps, automatically detecting, with the receiving device, said distinctive sequences of omitted video fields of detailed internal images in said specific limited moving portions of the display; and during said playing, aiming and detecting steps, automatically indicating, with the receiving device, when a distinctive sequence of omitted video fields of said detailed internal images in said specific limited moving portions is detected.

28. A method for automatically testing a person's ability to aim at, and to maintain aim at, a particular image that moves among other scene elements in a video game or video learning-system display; and for testing such ability irrespective of whether said other scene elements move; said method comprising the steps of:

obtaining a video recording which carries video signals corresponding to scenes with a particular limited moving portion moving among other scene elements; said limited moving portion having selected interlace fields removed to provide a distinctive sequence of pulses of said limited moving portion; and said other scene elements not having said selected interlace fields removed, so that said other scene elements lack said distinctive sequence of pulses;

then playing the video recording on a substantially standard video recording player to produce said game or learning-system display, including said scenes, and said distinctively pulsed limited moving portion therein, on a substantially standard television receiver;

during said playing step, attempting to aim at a specific limited moving portion of the display, and attempting to maintain aim while said specific limited portion moves among said other scene elements, an automatic optical receiving device that has no parts in common with the player or receiver, is not connected with the player or receiver, does not depend for its operation in said method upon providing an output signal of any kind to the player or receiver, and is disposed at a distance from the receiver;

during said playing and aiming steps, automatically detecting, with the receiving device, distinctive sequences of omitted video fields from said specific limited moving portion of the display; and during said playing, aiming and detecting steps, automatically indicating, with the receiving device, whether a distinctive sequence of omitted video fields from said specific moving portion is detected, to test whether said aiming is accurate irrespective of whether any of said other scene elements is moving or not.

29. A method for automatically testing a person's ability to aim at a particular image, having internal image details, that appears among other scene elements in a video game or video learning-system display; and for testing such ability irrespective of whether the internal images and the other scene elements have confusing similarities; said method comprising the steps of:

obtaining a video recording which carries video signals corresponding to scenes with a limited portion that contains internal image details; said internal image details having selected interlace fields removed to provide a distinctive sequence of pulses of said internal image details from said limited portion; and said other scene elements not having said selected interlace fields removed, so that said other scene elements lack said distinctive sequence of pulses;

then playing the video recording on a substantially standard video recording player to produce said game or learning-system display, including said scenes and said distinctively pulsed internal image details therein, on a substantially standard television receiver;

during the playing step, attempting to aim at a specific limited internally-detailed portion of the display, notwithstanding any confusing similarities between said internal details and said other scene elements, an automatic optical receiving device that has no parts in common with the player or receiver, is not connected with the player or receiver, does not depend for its operation in said method upon providing an output signal of any kind to the player or receiver, and is disposed at a distance from the receiver;

during the playing and aiming steps, automatically detecting, with the receiving device, distinctive sequences of omitted video fields from said specific limited internally-detailed portion of the display; and during the playing, aiming and detecting steps, automatically indicating, with the receiving device, whether a distinctive sequence of omitted video fields is detected from said specific internally-detailed portion is detected, irrespective of any confusing similarities between sad specific internally-detailed portion and said other scene elements.

30. A video recording, for use in automatically testing a person's ability to select and maintain aim at moving targets containing detailed internal images, in a video game or video learning-system display; said video recording being for use with a substantially standard video-recording player and substantially standard video-display unit, and comprising:

a video recording medium for play on such substantially standard player to display images on such substantially standard display unit;

video signals, impressed upon said medium, corresponding to scenes having internally-detailed moving targets, and having other scene elements;

certain portions of said signals corresponding to said internally-detailed moving targets, and other portions of said signals corresponding to said other scene elements;

said certain target-corresponding portions having selected interlace fields removed to provide a distinctive sequence of pulses of internal details of said moving targets; said other portions of said signals not having said selected interlace fields removed; and said signals being for playback on such a substantially standard-video recording player to produce, on such a substantially standard video display unit, said game or learning-system display, including said scenes and said certain internally-detailed moving targets therein, and also including said other scene elements therein;

whereby said internally-detailed moving targets are optical-pulse self-coded for automatic detection by an automatic optical receiving device that has no parts in common with the player or display unit, is not connected with the player or display unit, does not depend for said automatic detection upon providing an output signal of any kind to the player or display unit, and is disposed at a distance from the display unit, irrespective of motion of said targets among said other scene elements and irrespective of whether said detailed internal images are confusingly similar to said other scene elements.

* * * * *